United States Patent
Lin

(10) Patent No.: US 11,829,329 B2
(45) Date of Patent: Nov. 28, 2023

(54) DEVICE, METHOD AND NON-TRANSITORY COMPUTER READABLE MEDIUM FOR WRITING IMAGE FILES INTO MEMORIES

(71) Applicant: PEGATRON CORPORATION, Taipei (TW)

(72) Inventor: Chiang-Wei Lin, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 436 days.

(21) Appl. No.: 17/030,185

(22) Filed: Sep. 23, 2020

(65) Prior Publication Data

US 2021/0149838 A1    May 20, 2021

(30) Foreign Application Priority Data

Nov. 14, 2019    (TW) .................................. 108141441

(51) Int. Cl.
*G06F 16/13* (2019.01)
*G06F 16/14* (2019.01)
*G06F 3/06* (2006.01)

(52) U.S. Cl.
CPC ............ *G06F 16/13* (2019.01); *G06F 3/0604* (2013.01); *G06F 3/0643* (2013.01); *G06F 3/0679* (2013.01); *G06F 16/148* (2019.01)

(58) Field of Classification Search
CPC ...... G06F 16/13; G06F 2/0604; G06F 3/0604; G06F 3/0643; G06F 3/0679
USPC ........................................................ 707/824
See application file for complete search history.

(56) References Cited

U.S. PATENT DOCUMENTS

| | | | |
|---|---|---|---|
| 5,216,612 A | * | 6/1993 | Cornett .............. G06Q 10/0875 705/29 |
| 8,271,470 B2 | | 9/2012 | Gonzalez et al. |
| 2004/0186765 A1 | * | 9/2004 | Kataoka ................. G06Q 10/06 705/7.29 |

(Continued)

FOREIGN PATENT DOCUMENTS

| TW | 201822038 | 6/2018 |
|---|---|---|
| TW | I651667 | 2/2019 |
| TW | I675292 | 10/2019 |

OTHER PUBLICATIONS

"Office Action of India Counterpart Application", dated Aug. 19, 2021, p. 1-p. 6.

*Primary Examiner* — Hosain T Alam
*Assistant Examiner* — Nicholas E Allen
(74) *Attorney, Agent, or Firm* — J.C. PATENTS

(57) ABSTRACT

Provided is a device for writing image files into memories, which includes a memory and a processor. The memory is configured to store an instruction. The processor is coupled to the memory, a hardware database and a software database. The processor is configured to access and execute the instruction from the memory to: confirm a production condition of a product, wherein the production condition includes a hardware component characteristic and a software component characteristic; generate an image file by comparing the hardware component characteristic with a plurality of hardware characteristic data in the hardware database, and comparing the software component characteristic with a plurality of software characteristic data in the software database; and write the image file into a product flash memory.

9 Claims, 12 Drawing Sheets

(56) References Cited

U.S. PATENT DOCUMENTS

| | | | |
|---|---|---|---|
| 2006/0048092 A1* | 3/2006 | Kirkley | G06F 9/451 |
| | | | 717/100 |
| 2006/0250248 A1* | 11/2006 | Tu | G06Q 10/06 |
| | | | 340/572.4 |
| 2006/0266832 A1* | 11/2006 | Howarth | H04L 41/12 |
| | | | 235/451 |
| 2007/0083436 A1* | 4/2007 | Kurushima | G06Q 10/087 |
| | | | 705/26.1 |
| 2007/0192754 A1 | 8/2007 | Hofsaess | |
| 2008/0313472 A1 | 12/2008 | Modesitt | |
| 2012/0005480 A1* | 1/2012 | Batke | G06F 21/572 |
| | | | 713/175 |
| 2016/0011884 A1* | 1/2016 | Venkiteswaran | G06F 12/0638 |
| | | | 713/2 |
| 2017/0185311 A1* | 6/2017 | Li | G06F 3/0659 |
| 2017/0344364 A1* | 11/2017 | Rachlin | G06F 8/52 |
| 2018/0034682 A1* | 2/2018 | Gulati | H04L 63/08 |
| 2018/0276315 A1* | 9/2018 | Kanuparthy | G06F 30/00 |
| 2020/0118076 A1* | 4/2020 | Ballaro | G06Q 30/0635 |
| 2020/0174870 A1* | 6/2020 | Xu | G06F 11/0784 |

\* cited by examiner

DEVICE, METHOD AND NON-TRANSITORY COMPUTER READABLE MEDIUM FOR WRITING IMAGE FILES INTO MEMORIES

CROSS-REFERENCE TO RELATED APPLICATION

This application claims the priority benefit of Taiwan application serial no. 108141441, filed on Nov. 14, 2019. The entirety of the above-mentioned patent application is hereby incorporated by reference herein and made a part of this specification.

BACKGROUND

Technical Field

This disclosure relates to an electronic device, a method and a non-transitory computer readable medium, in particular to a device, a method and a non-transitory computer readable medium for writing an image file fit for a product into a product flash memory.

Description of Related Art

Before an electronic product is put into production, a software program used to control the product needs to be written (also known as burned) into a flash memory in advance, so that the electronic product can operate by itself. In the conventional technology, data to be burned into the flash memory is made into an image file with the same capacity as the flash memory, and then written into a flash memory chip by a writing device.

However, products of different models or with different functions require different software components. Even in products of the same model and with the same function, a software component installed in the image file may have different addresses based on different user needs.

SUMMARY

In view of the aforementioned problems, the disclosure proposes the following embodiments in which a device automatically writes an image file into a flash memory of a product according to product requirements.

An embodiment of the disclosure relates to a device for writing image files into memories, suitable for coupling to a hardware database and a software database. The device for writing image files into memories includes at least a memory and a processor. The processor is coupled to the memory, the hardware database and the software database. The processor is configured to access and execute at least one instruction from the memory to perform the following. A production condition of a product is confirmed, wherein the production condition includes a hardware component characteristic and a software component characteristic. An image file is generated by comparing the hardware component characteristic with a plurality of hardware characteristic data in the hardware database and comparing the software component characteristic with a plurality of software characteristic data in the software database. The image file is written into a product flash memory.

Another embodiment of the disclosure relates to a method for writing image files into memories. The method for writing image files into memories includes the following steps. A production condition of a product is confirmed, wherein the production condition includes a hardware component characteristic and a software component characteristic. A hardware database and a software database are accessed. An image file is generated by comparing the hardware component characteristic with a plurality of hardware characteristic data in the hardware database and comparing the software component characteristic with a plurality of software characteristic data in the software database. The image file is written into a product flash memory.

Still another embodiment of the disclosure relates to a non-transitory computer readable medium. The non-transitory computer readable medium is associated with a method for writing image files into memories, and the method for writing image files into memories includes the following steps. A production condition of a product is confirmed, wherein the production condition includes a hardware component characteristic and a software component characteristic. A hardware database and a software database are accessed. An image file is generated by comparing the hardware component characteristic with a plurality of hardware characteristic data in the hardware database and comparing the software component characteristic with a plurality of software characteristic data in the software database. The image file is written into a product flash memory.

Therefore, according to the aforementioned embodiments of the disclosure, according to the specifications of the processor and memory of the product, a corresponding image file can be automatically queried, learned, and generated, and the product is thereby written into the memory.

BRIEF DESCRIPTION OF THE DRAWINGS

The content of the disclosure may be better comprehended with reference to the exemplary embodiments in the following paragraphs and the figures below.

DESCRIPTION OF THE EMBODIMENTS

The disclosure will be described in detail below with reference to the drawings and descriptions. Embodiments of the disclosure may be varied or modified by any person skilled in the art who has read what follows according to the teachings of the disclosure, and such variations and modifications are within the spirit and scope of the disclosure.

In this specification, terms such as "contain", "include", "have", "encompass" etc. are open-ended words, and should be interpreted as "include but not limited to".

The terms used in this specification, unless otherwise indicated, usually have common meanings of the terms used in the art, in the content of the disclosure, and in special content. Some terms used to describe the disclosure are discussed below or elsewhere in the specification to provide additional guidance in the description of the disclosure to those skilled in the art.

Figure 1:
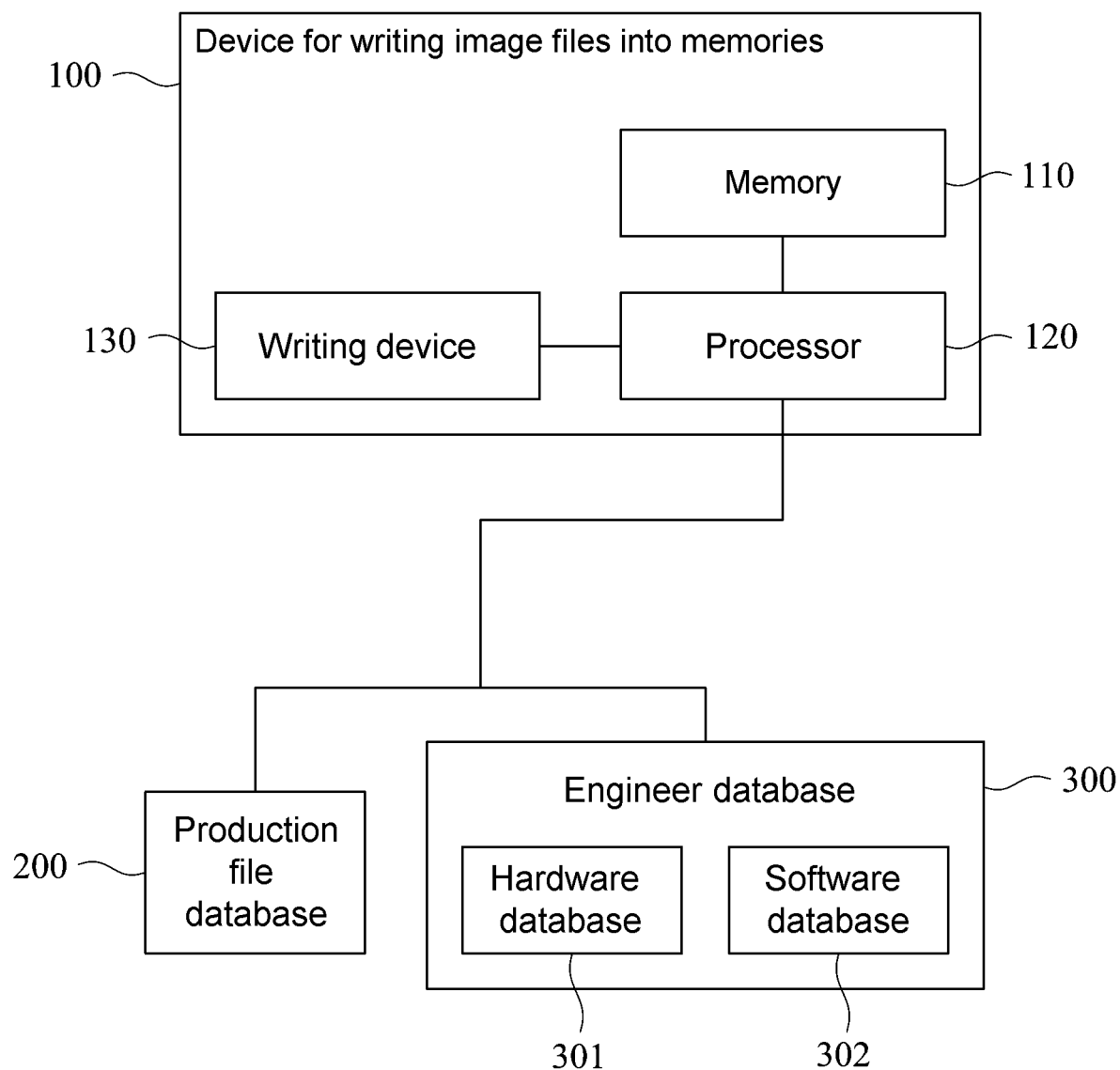
FIG. 1 is a schematic diagram of a system for writing image files into memories based on some embodiments of the disclosure.

Please refer to FIG. 1, which is a schematic diagram of a system for writing image files into memories based on some embodiments of the disclosure. As shown in FIG. 1, in some embodiments, a device for writing image files into memories 100 includes at least a memory 110 and a processor 120, and the memory 110 is electrically/communicatively coupled to the processor 120. In some embodiments, the device for writing image files into memories 100 further includes a writing device 130, and the writing device 130 is also electrically/communicatively coupled to the processor 120.

In some embodiments, the processor 120 is communicatively coupled to a production file database 200 and an engineer database 300. In some embodiments, the production file database 200 is configured to store data of known products and new products, including their product codes, product types, and/or component material numbers. In some embodiments, the engineer database 300 includes a hardware database 301 and a software database 302. The hardware database 301 is configured to store hardware characteristic data of the known products, including their processors, flash memories etc. The software database 302 is configured to store software characteristic data of the known products, including their core programs for production, core programs for shipping, inspection programs, debugging programs, etc.

It should be understood that "electrically coupled" or "communicatively coupled" herein may mean physically coupled or non-physically coupled. For example, in some embodiments, the memory 110 and the processor 120 may be coupled through a physical circuit, whereby the two may also perform a two-way message exchange. In some embodiments, the processor 120 may be coupled to the production file database 200 through wireless communication technology, whereby the two may perform a two-way message exchange. Those mentioned in the foregoing embodiments may be referred to as being "electrically coupled" or "communicatively coupled" to each other.

In some embodiments, the memory 110 may include, but is not limited to, one or a combination of a flash memory, a hard disk drive (HDD), a solid state drive (SSD), a dynamic random access memory (DRAM), and a static random access memory (SRAM). The memory 110 may store at least one computer readable instruction which may be accessed and executed by the processor 120 so as to run an application program to implement a function of the device for writing image files into memories 100.

In some embodiments, the processor 120 may include, but is not limited to, a single processor or an integration of a plurality of microprocessors, for example, a central processor (CPU), a graphics processor (GPU), or an application-specific integrated circuit (ASIC). As mentioned above, in some embodiments, the processor 120 may be configured to access and execute the computer readable instruction from the memory 110, so as to run the application program to implement the function of the device for writing image files into memories 100.

In some embodiments, the writing device 130 may include, but is not limited to, a writing device for a flash memory. The writing device 130 is configured to write (also known as burn) a voltage of the corresponding data into a specific transistor memory unit in the flash memory (for example, a NOR flash memory or a NAND flash memory), so that the data is stored at a specific address in the flash memory.

To facilitate understanding of the disclosure, the content of the application program run by the processor 120 is described in detail in the following paragraphs.

Figure 2:
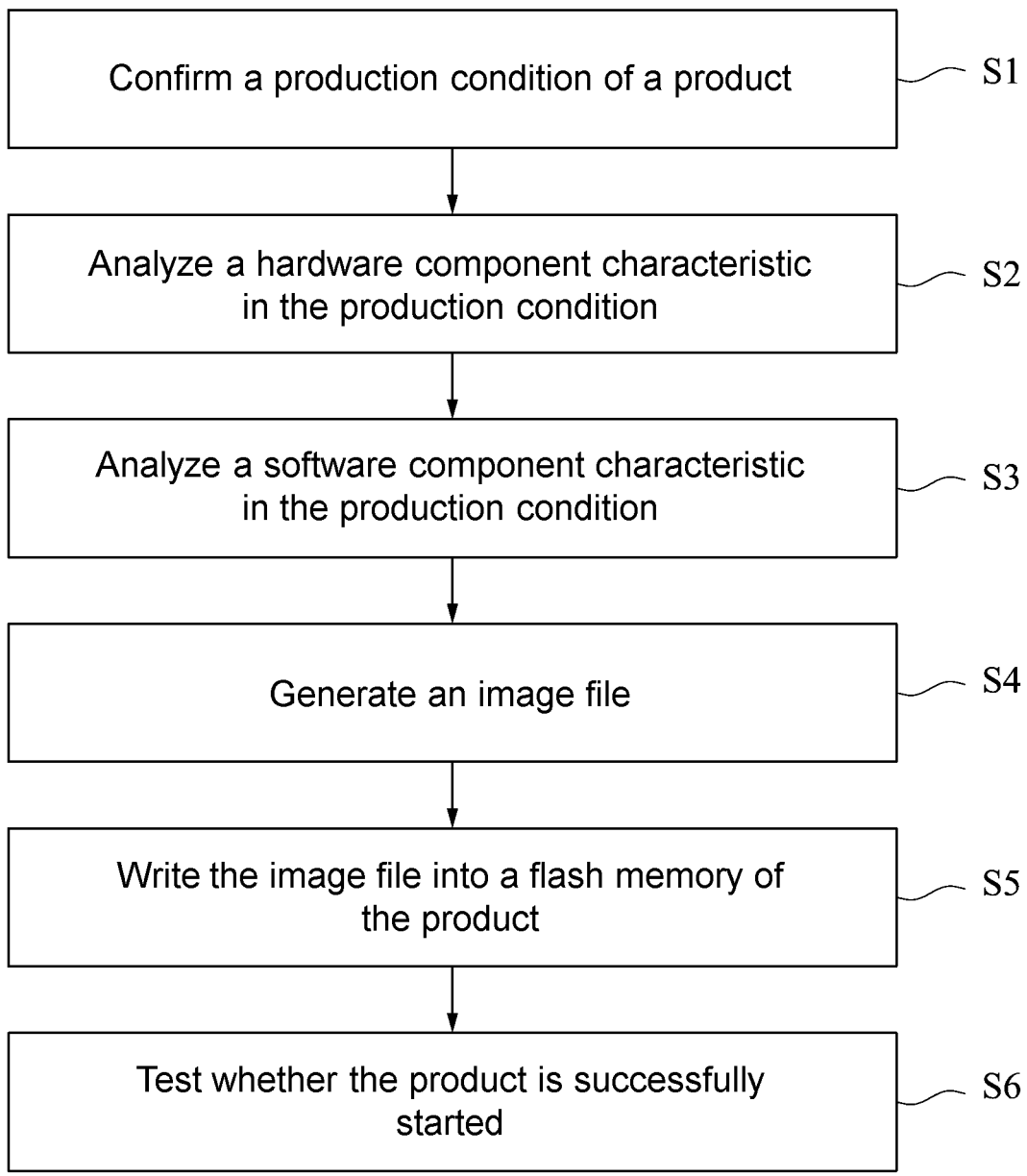
FIG. 2 is a flowchart of a method for writing image files into memories based on some embodiments of the disclosure.

Please refer to FIG. 2, which is a flowchart of a method for writing image files into memories based on some embodiments of the disclosure. As shown in FIG. 2, in some embodiments, the method for writing the image file into the memory is operated by the processor 120 of the device for writing image files into memories 100 in FIG. 1. Please refer to the embodiment of FIG. 1 together for better comprehension.

In detail, the method for writing image files into memories shown in FIG. 2 is the application program described in the embodiment of FIG. 1, which is operated by the processor 120 by reading and executing the computer readable instruction from the memory 110. In some embodiments, the detailed steps of the method for writing image files into memories are as follows.

Figure 3:
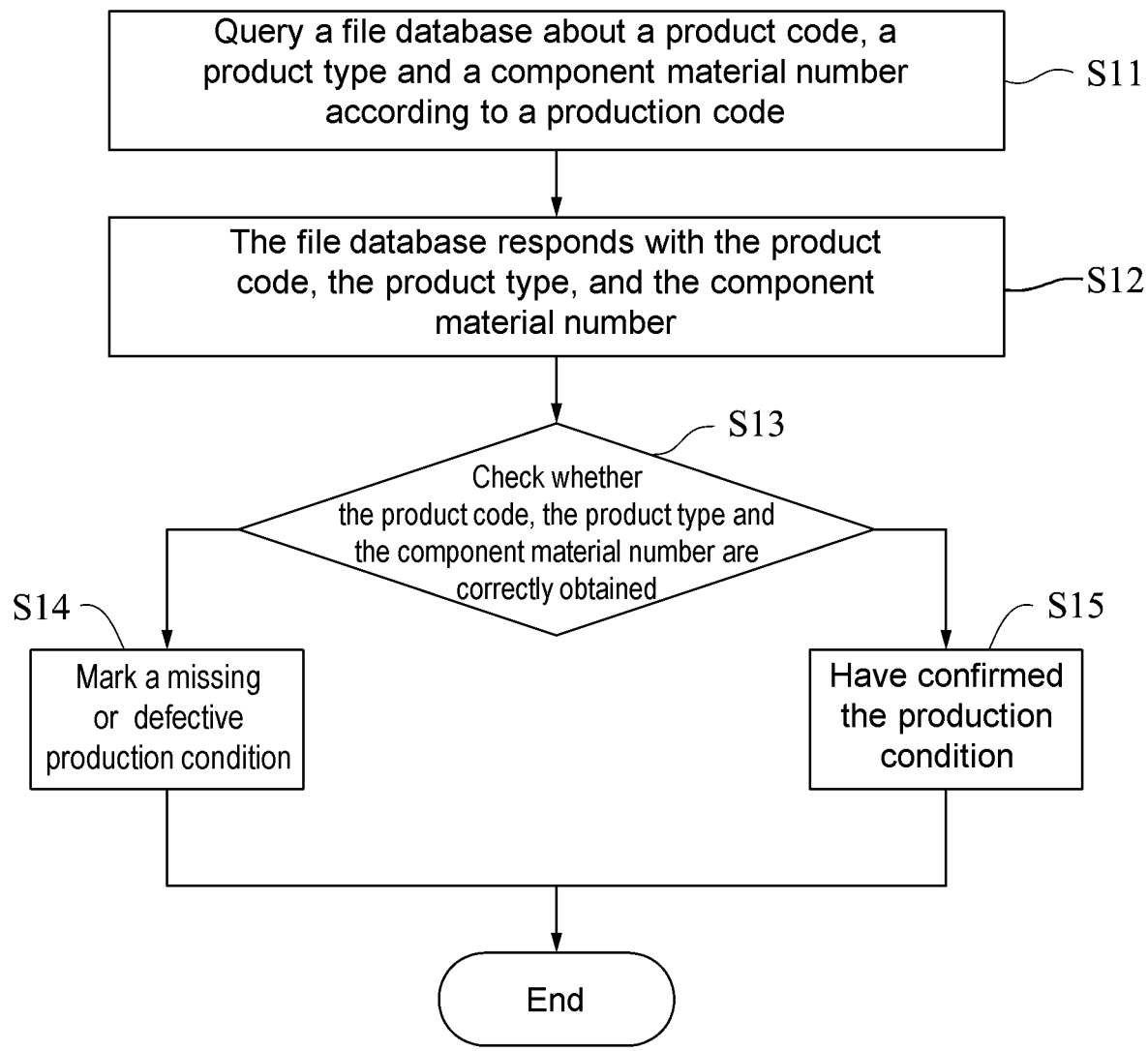
FIG. 3 is a flowchart of a production condition confirmation program based on some embodiments of the disclosure.

Step S1 is to confirm a production condition of a product. In some embodiments, before generating an image file corresponding to a specific product, the processor 120 may first confirm whether a production condition of the product is complete and ready for use. For better comprehension, please refer to FIG. 3, which is a flowchart of a production condition confirmation program based on some embodiments of the disclosure (that is, a detailed process of Step S1).

Step S11 is to query a file database about a product code, a product type and a component material number according to a production code. In some embodiments, when confirming the production condition, the processor 120 may read a production code (for example, M202014) of the product and execute a query. The processor 120 may access the production file database 200 and query about a product code, a product type and/or a component material number of the product based on the production code.

Step S12 is that the file database responds with the product code, the product type, and the component material number. In some embodiments, the production file database 200 may respond with the product code (for example, PD102), the product type (for example, IOT04), and the component material number (for example, A14, B062, F0710) of the product according to the production code. It should be understood that the product code, the product type, and the component material number of the product specify a hardware component characteristic and a software component characteristic of the product.

Step S13 is to check whether the product code, the product type and the component material number are correctly obtained. If no, Step S14 is executed; if yes, Step S15 is executed. In some embodiments, the processor 120 may check whether the product code, the product type, and the component material number are correctly obtained from the production file database 200.

Step S14 is to mark a missing or defective production condition. If any one of the product code, the product type and the component material number is missing or defective, a notification message is generated by the processor 120 to an administrator or a user of the device for writing image files into memories 100 to notify the administrator or the user to correct or amend the production condition, so that an image file writing program can continue to execute. In this case, the production condition confirmation program ends, and the processor 120 may suspend or stop the method for writing image files into memories.

Step S15 is that the production condition has been confirmed. If the product code, the product type and the component material number are all complete and ready for use, the processor 120 determines that the production condition has been confirmed.

In this case, the production condition confirmation program ends and the processor 120 may continue to execute Step S2 of the method for writing image files into memories.

Figure 4:
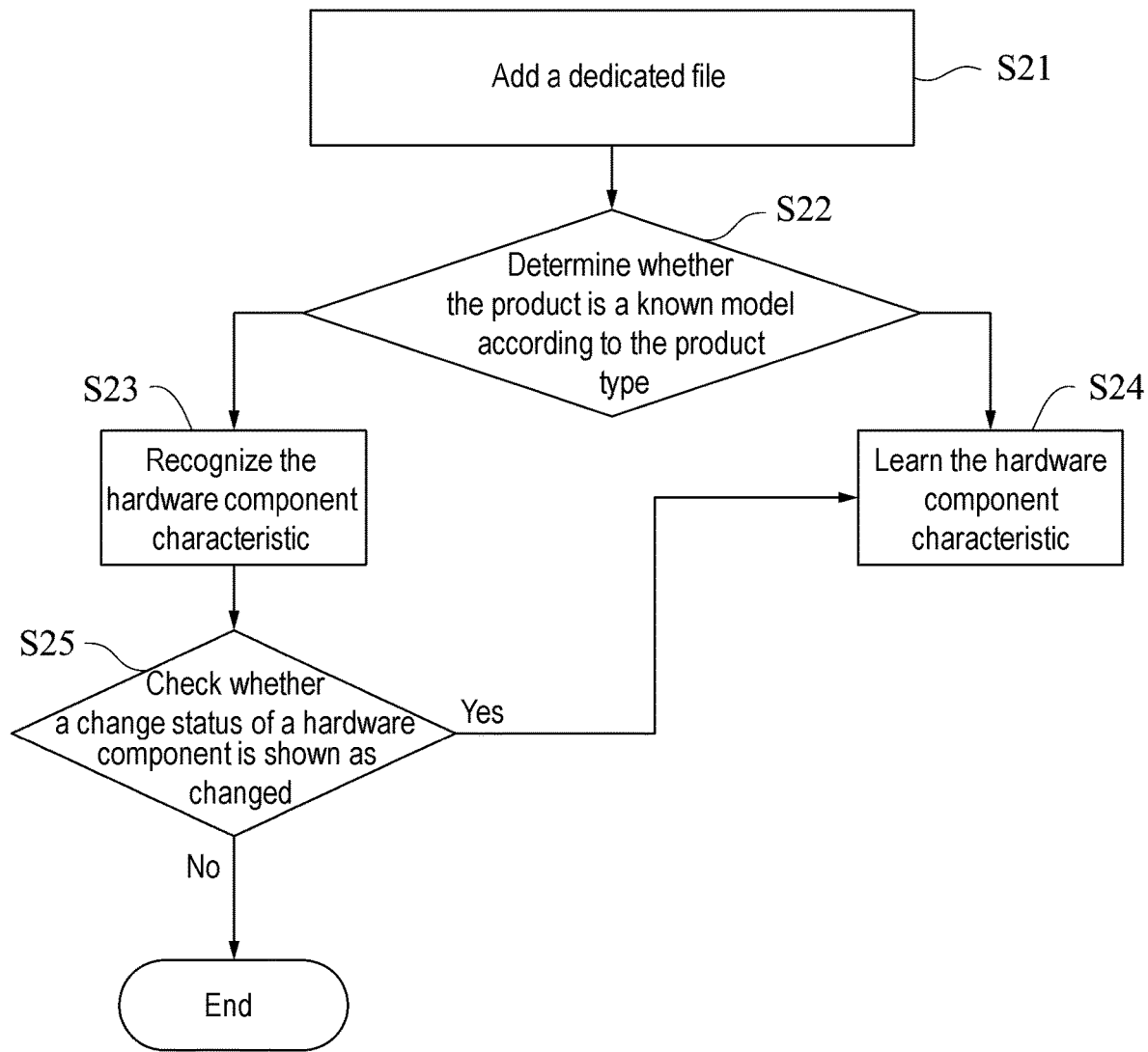
FIG. 4 is a flowchart of a hardware component analysis program based on some embodiments of the disclosure.

Step S2 is to analyze a hardware component characteristic in the production condition. In some embodiments, after the production condition of the product is confirmed to be complete and ready for use, the processor 120 may analyze the hardware component characteristic in the production condition, and compare the hardware component characteristic with a plurality of hardware characteristic data in the hardware database 301. For better comprehension, please refer to FIG. 4, which is a flowchart of a hardware component analysis program based on some embodiments of the disclosure (that is, a detailed process of Step S2).

Step S21 is to add a dedicated file. In some embodiments, the processor 120 may add a blank dedicated file for the product. The dedicated file may contain several items or fields for the processor 120 to check the software component characteristic and the hardware component characteristic of the product, thereby generating a corresponding image file.

Step S22 is to determine whether the product is a known model according to the product type. If yes, Step S23 is executed; if no, Step S24 is executed. In some embodiments, the processor 120 may determine whether the product matches a known model recorded in the engineer database 300 according to the product type, so as to decide whether to execute a hardware component characteristic recognition program or a hardware component characteristic learning program.

Figure 5:
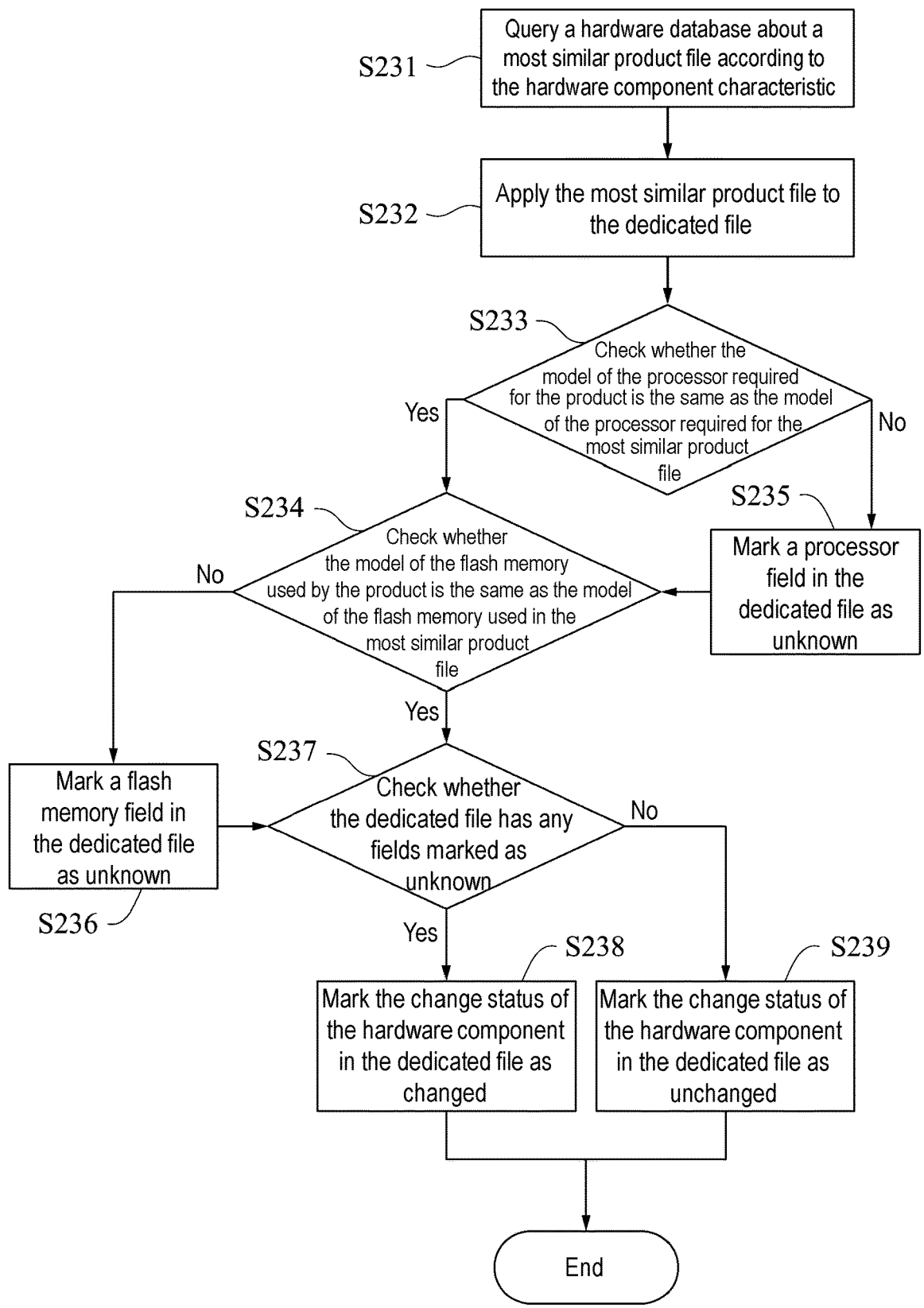
FIG. 5 is a flowchart of a hardware component characteristic recognition program based on some embodiments of the disclosure.

Step S23 is to recognize the hardware component characteristic. If the product matches the known model, the processor 120 may execute the hardware component characteristic recognition program to confirm whether the product and the known model have completely identical specifications. For better comprehension, please refer to FIG. 5, which is a flowchart of the hardware component characteristic recognition program based on some embodiments of the disclosure (that is, a detailed process of Step S23).

Step S231 is to query a hardware database about a most similar product file according to the hardware component characteristic. In some embodiments, the hardware database 301 in the engineer database 300 is accessed by the processor 120, and a plurality of entries of hardware characteristic data in the hardware database 301 are compared according to the product code, the product type, and the component material number (especially a hardware component material number) in the production condition, so as to find the most similar product file to the product in history. It should be understood that the most similar product file may be determined by a degree of match among the product code, the product type and the component material number (for example, two of them are the same), but is not limited thereto.

Step S232 is to apply the most similar product file to the dedicated file. After the processor 120 has found the most similar product file, the processor 120 may first apply details of the most similar product file to the dedicated file added for the product.

Step S233 is to check whether a processor of the product and that of the most similar product file are of the same model. If yes, Step S234 is executed; if no, Step S235 is executed. After the processor 120 applies the details of the most similar product file to the dedicated file, the processor 120 may check whether the model of the processor required for the product is the same as the model of the processor required for the most similar product file.

Step S234 is to check whether a flash memory of the product and that of the most similar product file are of the same model. If no, Step S236 is executed; if yes, Step S237 is executed. After the processor 120 confirms that the processor of the product and the processor of the most similar product file are of the same model, the processor 120 checks whether the model of the flash memory used by the product is the same as the model of the flash memory used in the most similar product file.

Step S235 is to mark a processor field in the dedicated file as unknown. If the processor 120 determines that the processor used by the product is not the same as the processor used in the most similar product file, the processor 120 may mark a field corresponding to the processor in the dedicated file as unknown. After Step S235, Step S236 is executed.

Step S236 is to mark a flash memory field in the dedicated file as unknown. If the processor 120 determines that the flash memory used by the product is not the same as the flash memory used in the most similar product file, the processor 120 may mark a field corresponding to the flash memory in the dedicated file as unknown. After Step S236, Step S237 is executed.

Step S237 is to check whether the dedicated file has any fields marked as unknown. If yes, Step S238 is executed; if no, Step S239 is executed. In some embodiments, the processor 120 may finally check whether the field corresponding to the processor or the flash memory in the dedicated file is marked as unknown.

Step S238 is to mark a change status of the hardware component in the dedicated file as changed. If the processor 120 checks and finds that one of the fields corresponding to the processor and the flash memory in the dedicated file is marked as unknown, the processor 120 marks a change status of the hardware component in the dedicated file as changed. This status represents that at least one of the processor and the flash memory of the product is not the same as its counterpart in the most similar product file.

Step S239 is to mark the change status of the hardware component in the dedicated file as unchanged. If the processor 120 checks and finds that the fields corresponding to the processor and the flash memory in the dedicated file are both marked as known, the processor 120 marks the change status of the hardware component in the dedicated file as unchanged. This status represents that both the processor and the flash memory of the product are the same as their counterparts in the most similar product file.

In some embodiments, after Step S238 or Step S239 is executed by the processor 120, the hardware component characteristic recognition program of Step S23 ends, and Step S25 is executed by the processor 120.

Step S25 is to check whether the change status of the hardware component is shown as changed. If yes, the processor 120 proceeds to Step S24; if no, the hardware component analysis program ends. The status shown as changed represents that at least one of the fields corresponding to the processor and the flash memory in the dedicated file is marked as unknown. At this time, the processor 120 may execute a hardware component characteristic learning program of Step S24 to learn an unknown hardware component characteristic of the product.

Figure 6:
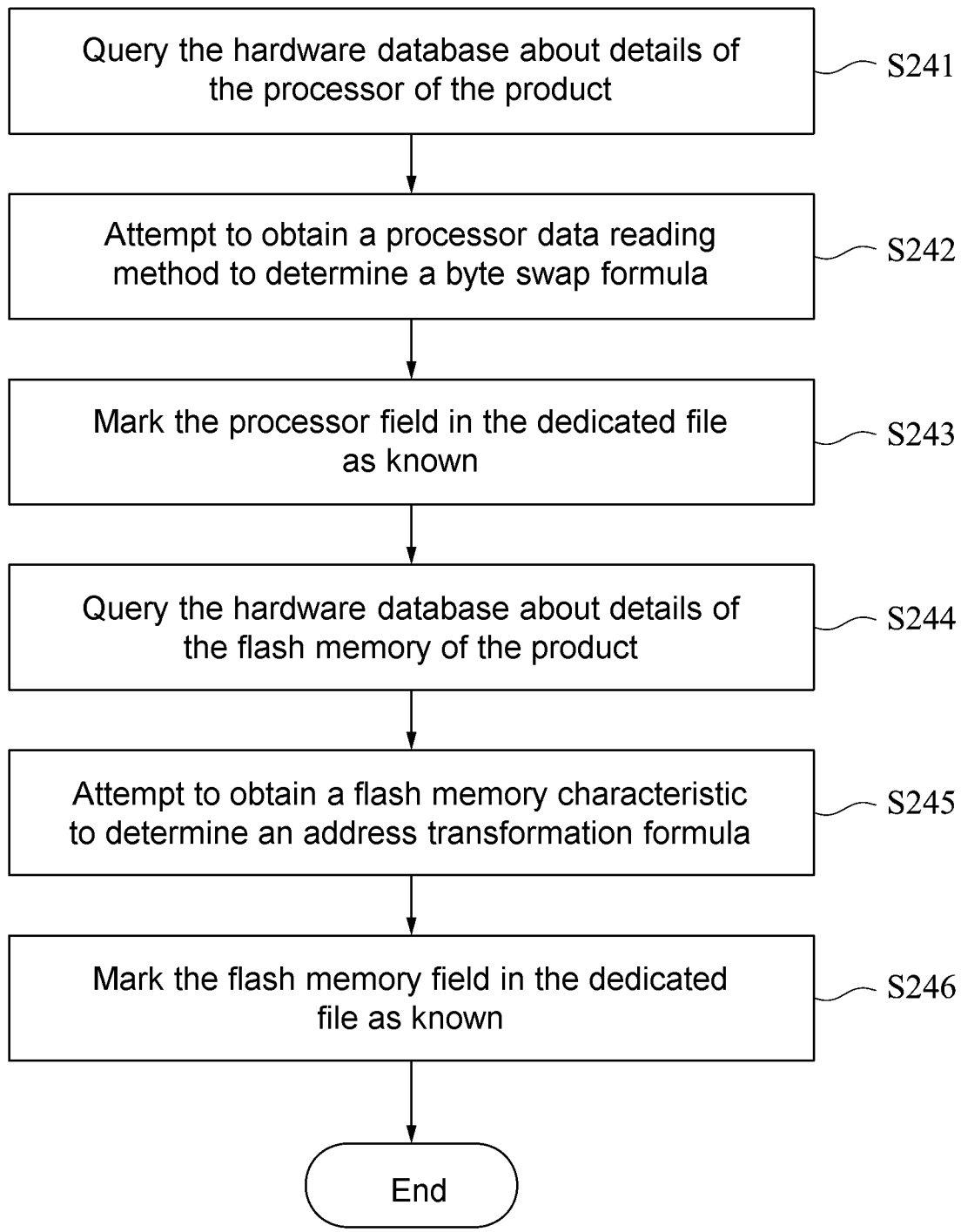
FIG. 6 is a flowchart of a hardware component characteristic learning program based on some embodiments of the disclosure.

Step S24 is to learn the hardware component characteristic. In some embodiments, if the product does not match the known model (the most similar product file), the processor 120 may execute the hardware component characteristic learning program to learn the hardware component characteristic of the product. For better comprehension, please refer to FIG. 6, which is a flowchart of the hardware component characteristic learning program based on some embodiments of the disclosure (that is, a detailed process of Step S24).

Step S241 is to query the hardware database about details of the processor of the product. The processor 120 may access the hardware database 301 in the engineer database 300, in order to query the hardware database 301 according to a processor material number in the hardware component material number of the product, and find out the details of the processor used by the product.

Step S242 is to attempt to obtain a processor data reading method to determine a byte swap formula. In some embodiments, the processor 120 may attempt to obtain a byte interpretation order of the processor used by the product according to accumulated historical experience, to determine a byte swap formula required for the product. In detail, the processor 120 may query the hardware database 301, and determine whether the processor used in the product has ever been used in the past according to whether the processor exists in the hardware database 301. If the processor has been used, a byte swap formula corresponding to the processor that has been used in the past is accessed. If the processor has not been used, the model of the processor used by the product is found through a query and the byte swap formula is obtained according to the model.

Step S243 is to mark the processor field in the dedicated file as known. After the processor 120 confirms the byte swap formula of the processor of the product, the processor 120 may mark the processor field in the dedicated file as known.

Step S244 is to query the hardware database about details of the flash memory of the product. The processor 120 may access the hardware database 301 in the engineer database 300, query the hardware database 301 according to a flash memory material number in the hardware component material number of the product, and find out the details of the flash memory used by the product.

Step S245 is to attempt to obtain a flash memory characteristic to determine address transformation formula. In some embodiments, the processor 120 may attempt to obtain a characteristic (for example, a characteristic of a NAND flash memory of allowing corruption of partial blocks) of the flash memory used by the product according to accumulated historical experience to determine an address transformation formula needed by the product. It should be understood that the address transformation formula described herein is decided according to a flash memory chip characteristic, and is generally defined by a flash memory chip supplier. In detail, the processor 120 may query the hardware database 301, and determine whether the flash memory used by the product has ever been used in the past according to whether the flash memory exists in the database. If the flash memory has been used, an address transformation formula corresponding to the flash memory that has been used in the past is accessed. If the flash memory has not been used, a chip model of the flash memory used by the product is found through a query, and the address transformation formula is obtained according to the chip model.

Step S246 is to mark the flash memory field in the dedicated file as known. After the processor 120 confirms the address transformation formula of the flash memory of the product, the processor 120 may mark the flash memory field in the dedicated file as known.

In some embodiments, after Step S246 is executed by the processor 120, the hardware component characteristic learning program of Step S24 ends, and the hardware component analysis program ends.

In some embodiments, after the hardware component analysis program of Step S2 has ended, the processor 120 may execute Step S3 to further analyze the software component of the product.

Figure 7:
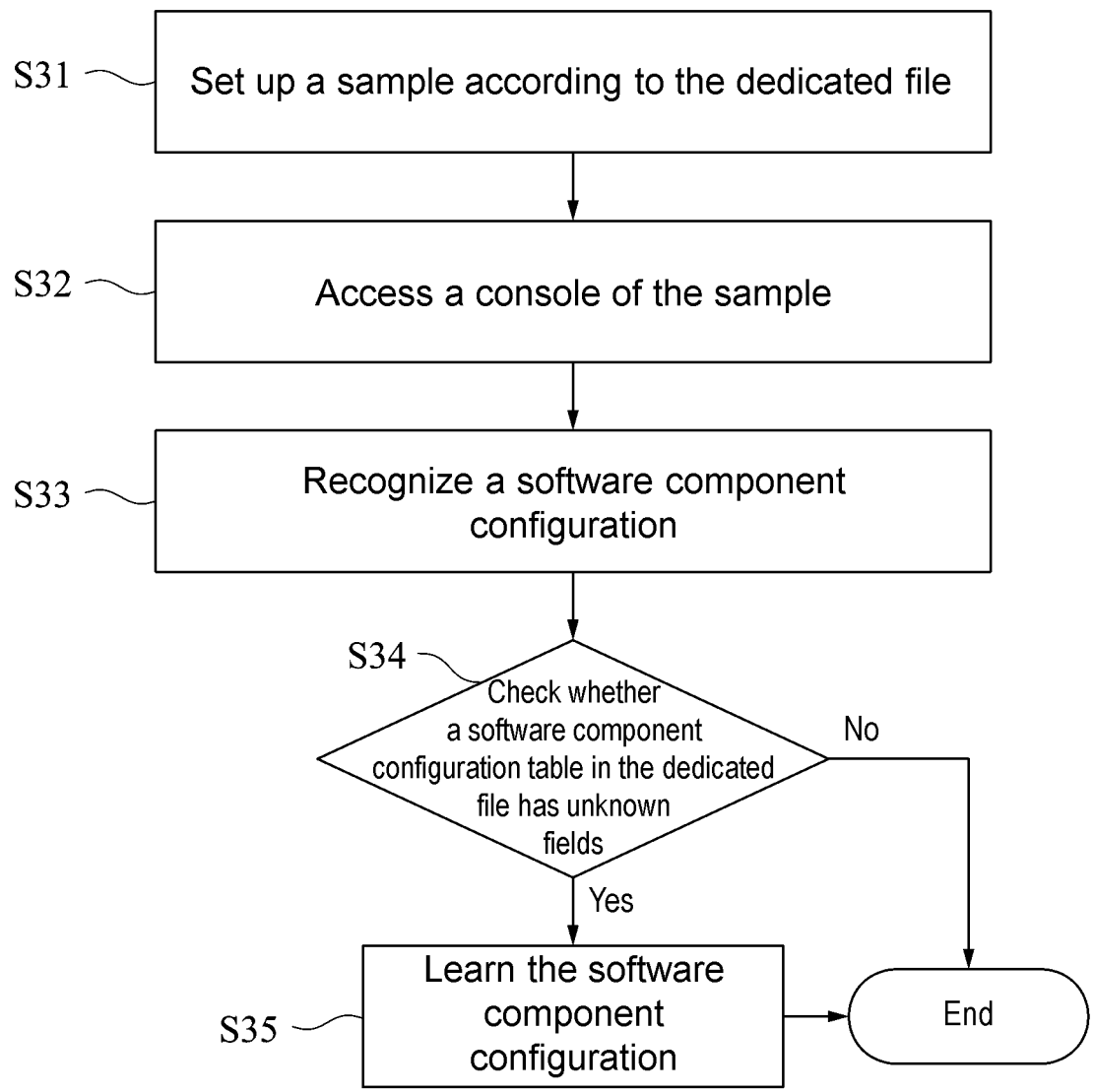
FIG. 7 is a flowchart of a software component analysis program based on some embodiments of the disclosure.

Step S3 is to analyze a software component characteristic in the production condition. In some embodiments, after the production condition of the product is confirmed to be complete and ready for use, the processor 120 may analyze the software component characteristic in the production condition and compare the software component characteristic (such as a software component configuration table) with a plurality of software characteristic data (such as a component configuration table of a sample) in the software database 302. For better comprehension, please refer to FIG. 7, which is a flowchart of a software component analysis program based on some embodiments of the disclosure (that is, a detailed process of Step S3).

Step S31 is to set up a sample according to the dedicated file. In some embodiments, the sample is an engineering pilot sample whose hardware specifications and software specifications both meet the production condition of the product and whose function should meet the specifications of the product.

Step S32 is to access a console of the sample. In some embodiments, the sample has a console that allows remote login. The console may be used to input an instruction to query about a status of the sample, set a function of the sample, or operate the sample.

Figure 8:
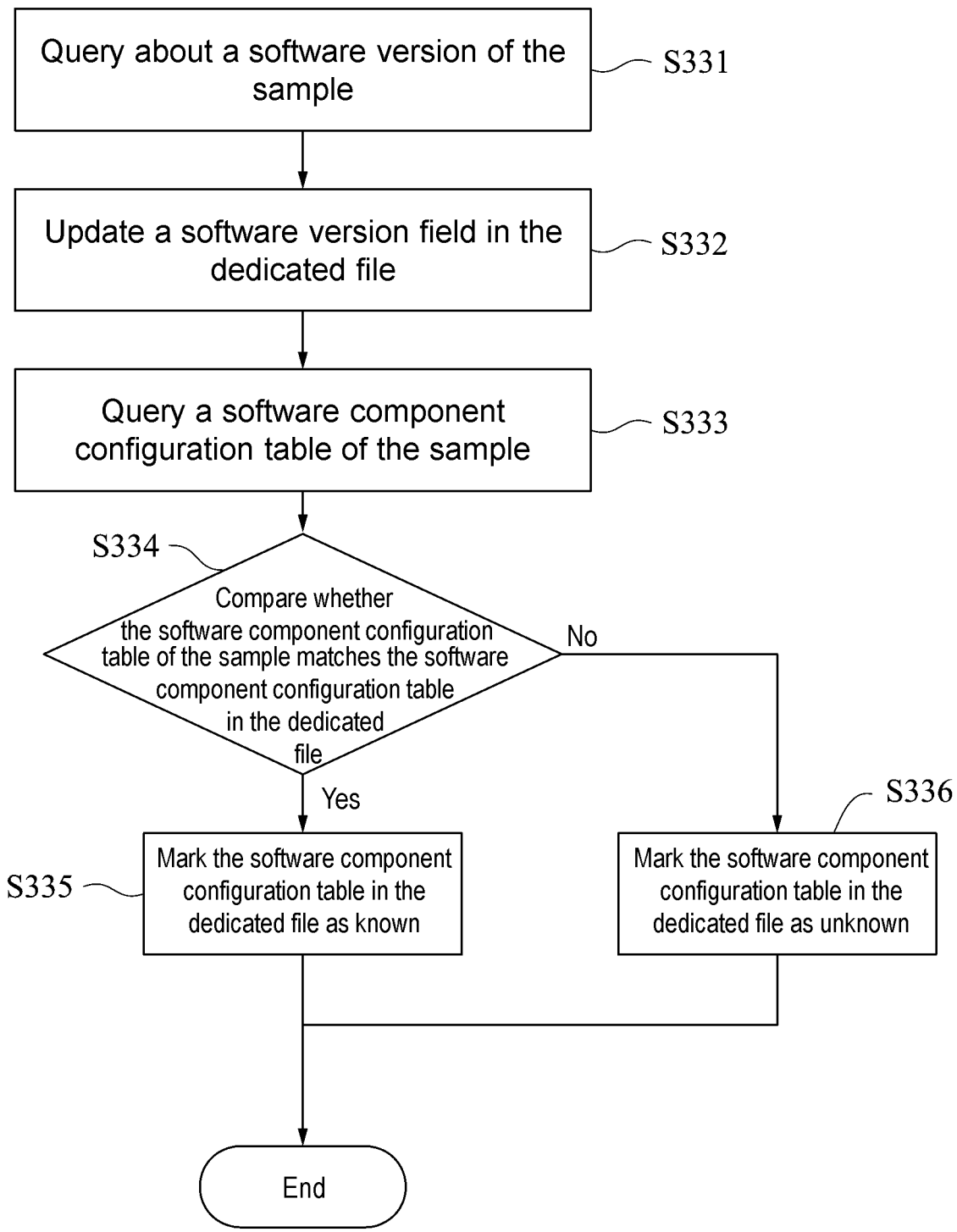
FIG. 8 is a flowchart of a software component configuration recognition program based on some embodiments of the disclosure.

Step S33 is to recognize a software component configuration. For better comprehension, please refer to FIG. 8, which is a flowchart of a software component configuration recognition program based on some embodiments of the disclosure.

Step S331 is to query about a software version of the sample. Since the sample is an engineering pilot sample, the processor 120 has to first query about a version of software pre-installed in the sample.

Step S332 is to update a software version field in the dedicated file. In some embodiments, the processor 120 may update a software version in the dedicated file according to the software version of the sample.

Step S333 is to query a software component configuration table of the sample. In some embodiments, the processor 120 may access a software component configuration table of the sample.

Step S334 is to compare whether the software component configuration table of the sample matches a software component configuration table in the dedicated file. If yes, Step S335 is executed; if no, Step S336 is executed. In some embodiments, the processor 120 may compare the software component configuration table of the sample with a software component configuration table in the dedicated file and determine whether they match.

Step S335 is to mark the software component configuration table in the dedicated file as known. If the processor 120 determines that the software component configuration table of the sample matches the software component configuration table in the dedicated file, and the numbers or types of software components also match, the processor 120 may mark the software component configuration table in the dedicated file as known.

Step S336 is to mark the software component configuration table in the dedicated file as unknown. If the processor 120 determines that the software component configuration table of the sample does not correctly match the software component configuration table in the dedicated file, the processor 120 may mark the software component configuration table in the dedicated file as unknown.

In some embodiments, after Step S335 or Step S336 is executed by the processor 120, the software component configuration recognition program of Step S33 ends, and Step S34 is executed by the processor 120.

Step S34 is to check whether the software component configuration table in the dedicated file has unknown fields. If yes, Step S35 is executed; if no, the software component analysis program ends. If the processor 120 determines that the software component configuration table in the dedicated file has no unknown fields, the processor 120 may end the software component analysis program.

Figure 9:
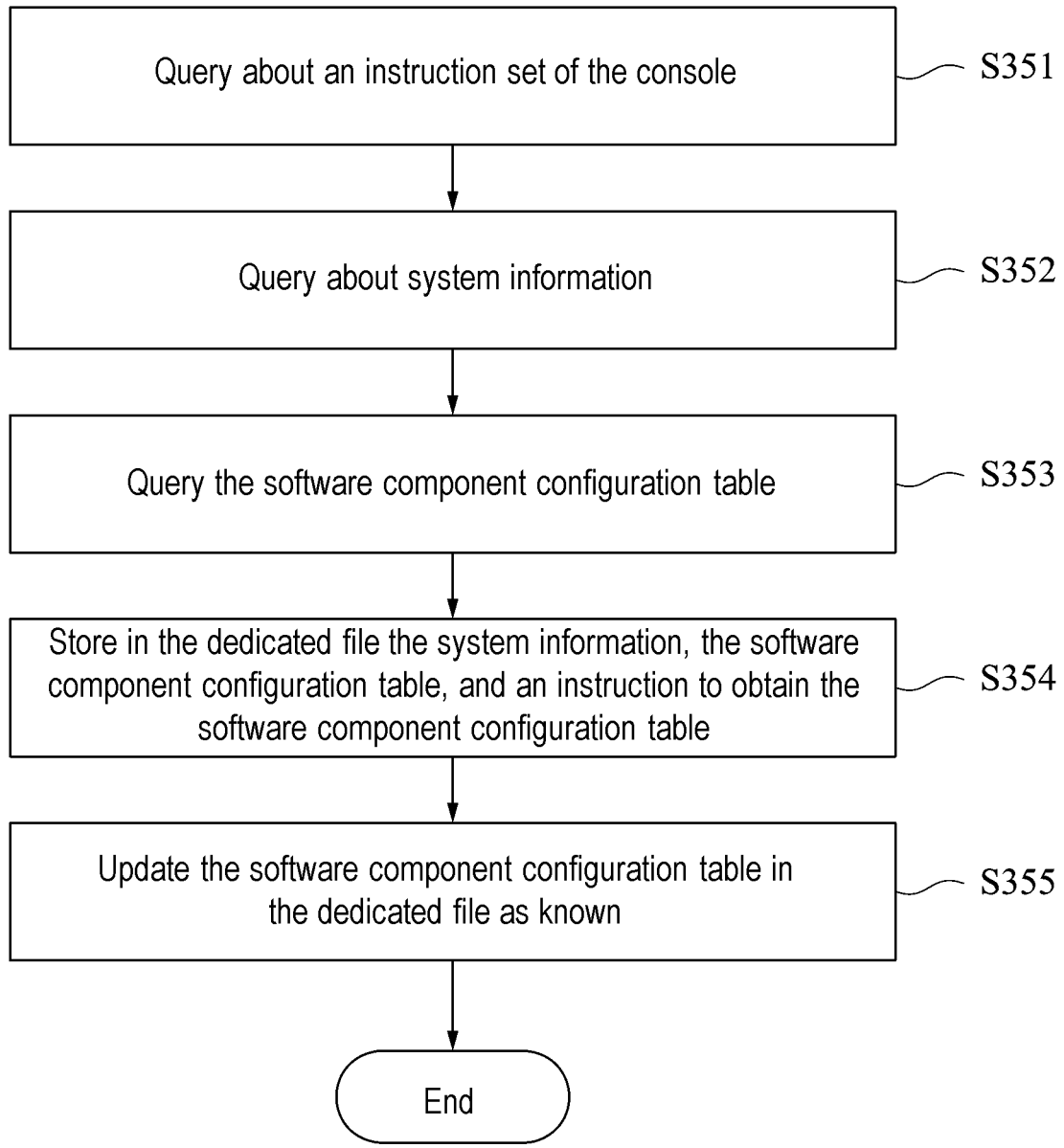
FIG. 9 is a flowchart of a software component configuration learning program based on some embodiments of the disclosure.

Step S35 is to learn the software component configuration. In some embodiments, if the software component configuration table in the dedicated file has an unknown field, the processor 120 may learn the software component configuration. For better comprehension, please refer to FIG. 9, which is a flowchart of a software component configuration learning program based on some embodiments of the disclosure (that is, a detailed process of Step S35).

Step S351 is to query about an instruction set of the console. As mentioned above, in some embodiments, the sample has a console that allows remote login. The processor 120 may query the console about an instruction set of the console.

Step S352 is to query about system information. In some embodiments, according to the instruction set of the console, the processor 120 may query about system information of the sample, such as a chip (processor, memory, etc.), an operating system, a software version, and a package version of the sample.

Figure 10:
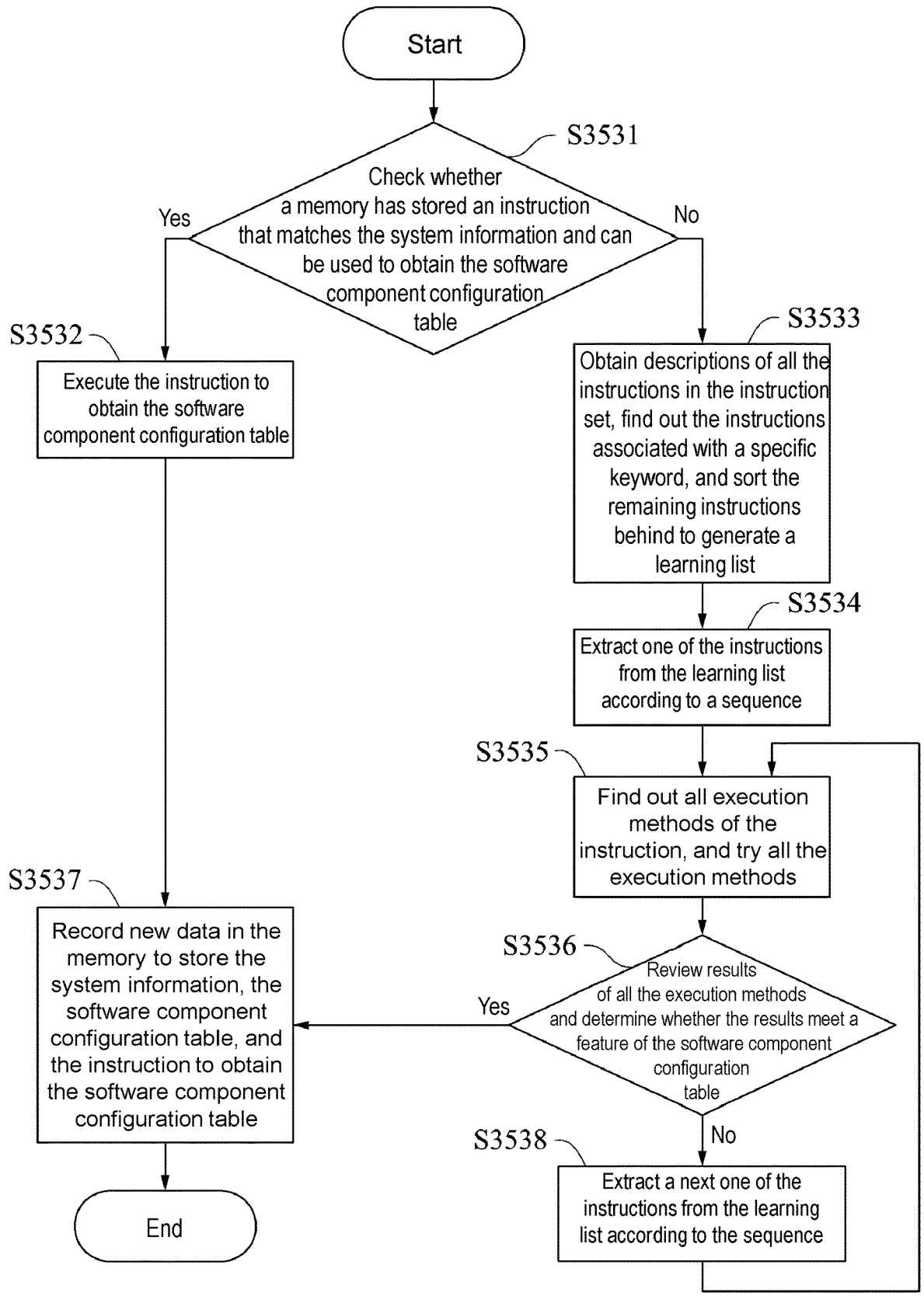
FIG. 10 is a flowchart of the software component configuration learning program based on some embodiments of the disclosure.

Step S353 is to query the software component configuration table. In some embodiments, the processor 120 determines whether the software component configuration table corresponding to the product can be obtained according to accumulated historical experience. For better comprehension, please refer to FIG. 10, which is a flowchart of the software component configuration learning program based on some embodiments of the disclosure (that is, a detailed process of Step S353).

Step S3531 is to check whether a memory has stored an instruction that matches the system information and may be used to obtain the software component configuration table. The processor 120 may query the memory 110 (or connect to other databases such as the production file database 200 or the engineer database 300) to confirm whether the memory 110 has stored data that matches the system information of the product and that is marked with an instruction on how to obtain the software component configuration table. If yes (both conditions are met), the processor 120 proceeds to Step S3532; if no, the processor 120 proceeds to Step S3533.

Step S3532 is to execute the instruction to obtain the software component configuration table. If the processor 120 has found in the database the data that matches the system information and this data is marked with the instruction on how to obtain the software component configuration table, the processor 120 may directly execute the instruction to obtain the software component configuration table. After Step S3532 is executed, the processor 120 proceeds to Step S3537.

Step S3533 is to obtain descriptions of all the instructions in the instruction set, find out the instructions associated with a specific keyword, and sort the remaining instructions behind to generate a learning list. In some embodiments, the processor 120 may filter the instructions based on a specific keyword. For example, the processor 120 may filter descriptions of all the instructions in the instruction set according to keywords such as "flash," "file system," "flash map," etc., and find out among all the instructions the instructions related to these keywords. After Step S3533 is executed, the processor 120 proceeds to Step S3534.

Step S3534 is to extract one of the instructions from the learning list according to a sequence. In some embodiments, the processor 120 extracts an instruction from the learning list according to an ascending sequence. In general, the processor 120 may begin with the first instruction in the sequence. After Step S3534 is executed, the processor 120 proceeds to Step S3535.

Step S3535 is to find out all execution methods of the instruction, and try all the execution methods. The processor 120 controls the sample via the console, executes the instruction in all the different execution methods (for example, by being fitted with different parameters) of the instruction and obtains results of the different execution methods. After Step S3535 is executed, the processor 120 proceeds to Step S3536.

Step S3536 is to review results of all the execution methods and determine whether the results meet a feature of the software component configuration table. If yes, the processor 120 proceeds to Step S3537; if no, the processor 120 proceeds to Step S3538. In some embodiments, after obtaining the results of the different execution methods, the processor 120 determines whether at least one of the results meets a feature of the software component configuration table. The feature of the software component configuration table includes an identification code of a software component, an address of a software component in the flash memory, and the like. It should be comprehended that if one of the results meets the feature of the software component configuration table, it means that the processor 120 has successfully obtained the software component configuration table.

Step S3537 is to record new data in the memory to store the system information, the software component configuration table, and the instruction to obtain the software component configuration table. In some embodiments, the processor 120 may add data to the memory 110 to record a specific instruction and an execution method thereof as a method for obtaining the software component configuration table corresponding to the system information. Therefore, after Step S3537, the data obtained in Step S3531 has been recorded in the memory 110. In some embodiments, Step S353 ends after the processor 120 has executed Step S3537, and the processor 120 proceeds to Step S354.

Step S3538 is to extract a next one of the instructions from the learning list according to the sequence. If the processor 120 determines that none of the results obtained by all the different execution methods of the instruction matches the feature of the software component configuration table, the processor 120 may extract a next one of the instructions from the learning list according to the ascending sequence. After Step S3538 is executed, the processor 120 returns to Step S3535.

Step S354 is to store the system information, the software component configuration table, and the instruction to obtain the software component configuration table in the dedicated file. When the processor 120 finds the correct system information and obtains the software component configuration table according to the specific instruction, the processor 120 may store the system information, the software component configuration table, and the instruction to obtain the software component configuration table in the dedicated file corresponding to the product.

Step S355 is to update the software component configuration table in the dedicated file as known. The processor 120 may store the software component configuration table in the dedicated file corresponding to the product. In some embodiments, after Step S355 is executed by the processor 120, the software component analysis program of Step S3 ends.

In some embodiments, after the software component analysis program of Step S3 has ended, the processor 120 may execute Step S4.

Figure 11:
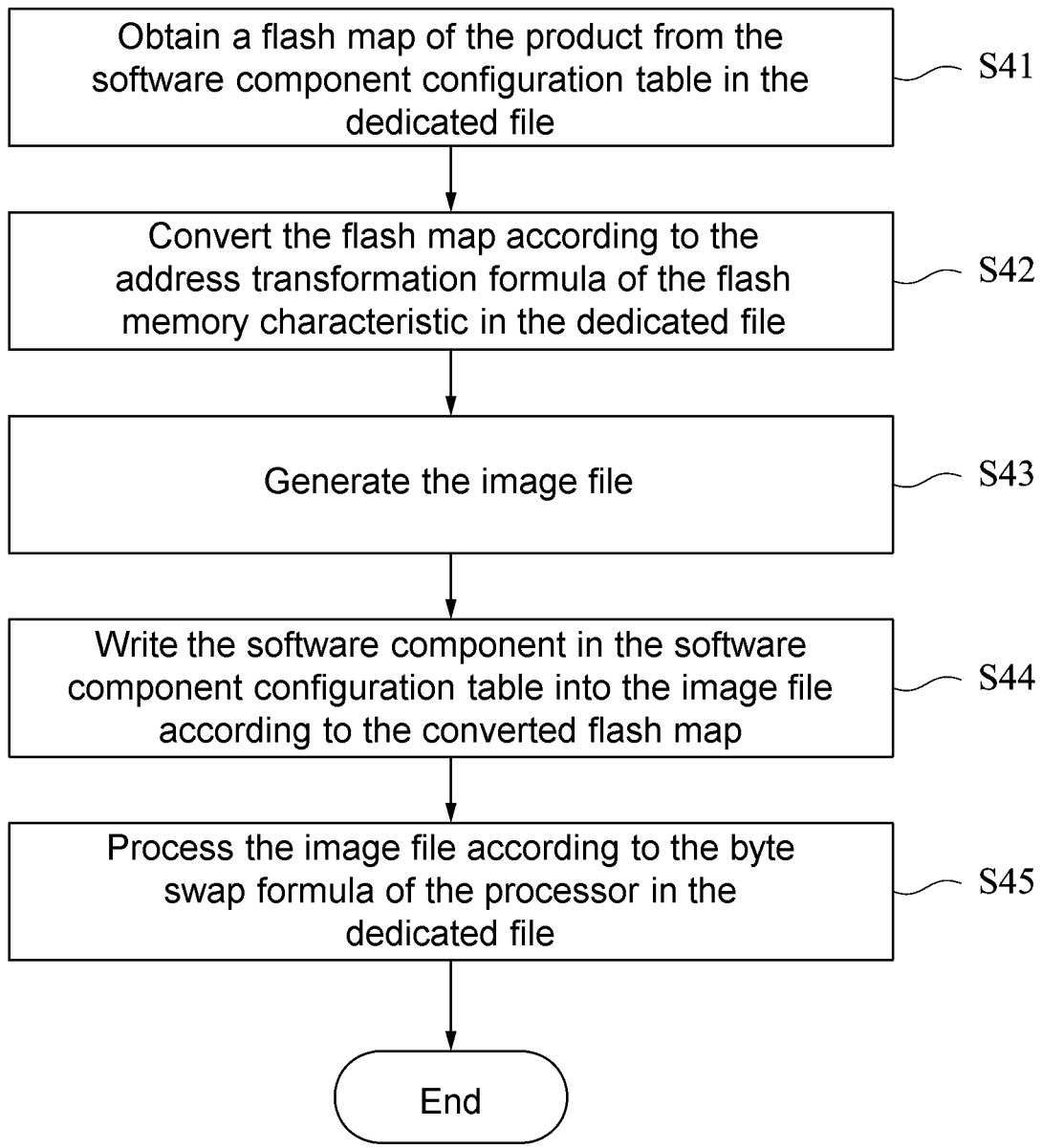
FIG. 11 is a flowchart of an image file generation program based on some embodiments of the disclosure.

Step S4 is to generate an image file. In some embodiments, the processor 120 may generate an image file according to a result of the hardware component analysis program of Step S2 and a result of the software component analysis program of Step S3. For better comprehension, please refer to FIG. 11, which is a flowchart of an image file generation program based on some embodiments of the disclosure (that is, a detailed process of Step S4).

Step S41 is to obtain a flash map of the product from the software component configuration table in the dedicated file. In some embodiments, the processor 120 may obtain a flash map of the product in the software component configuration table in the dedicated file, and the flash map has recorded a plurality of memory addresses.

Step S42 is to convert the flash map according to the address transformation formula of the flash memory characteristic in the dedicated file. In some embodiments, the processor 120 may convert an initial flash map according to the address transformation formula obtained in the dedicated file and generate a converted flash map.

Step S43 is to generate the image file. The processor 120 generates the image file according to the converted flash map.

Step S44 is to write the software component in the software component configuration table into the image file according to the converted flash map. In some embodiments, the processor 120 writes the software component in the dedicated file corresponding to the product into the image file according to the converted flash map.

Step S45 is to process the image file according to the byte swap formula of the processor in the dedicated file. In some embodiments, the processor 120 may apply the obtained byte swap formula in the dedicated file to the image file written in the software component and generate a new image file. Therefore, the new image file may correctly fit the processor of the product.

In some embodiments, the processor 120 may execute Step S5 after the image file generation program of Step S4 has ended.

Figure 12:
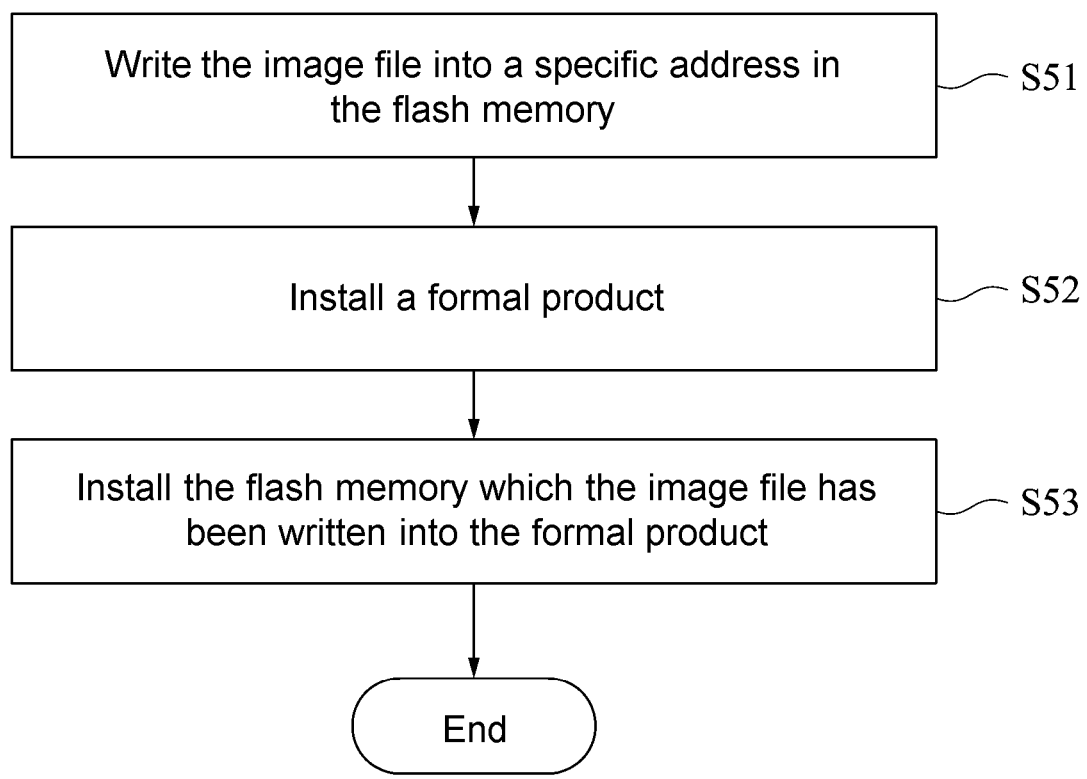
FIG. 12 is a flowchart of the image file generation program based on some embodiments of the disclosure.

Step S5 is to write the image file into the flash memory of the product. For better comprehension, please refer to FIG. 12, which is a flowchart of the image file generation program based on some embodiments of the disclosure (that is, a detailed process of Step S5).

Step S51 is to write the image file into a specific address in the flash memory. In some embodiments, the processor 120 may control the writing device 130 to write (also known as burn) the new image file into a specific address in the flash memory.

Step S52 is to install a formal product. In some embodiments, the processor 120 may install a formal product according to the dedicated file.

Step S53 is to install the flash memory which the image file has been written into the formal product. The processor 120 may install the flash memory which the image file has been written into the formal product. At this point, the formal product corresponding to the current product is roughly completed and Step S5 ends.

In some embodiments, after the image file generation program of Step S5 has ended, the processor 120 may execute Step S6.

Step S6 is to test whether the product is successfully started. In some embodiments, the processor 120 may attempt to start the formal product to test whether a processor of the formal product can operate normally according to the image file written into the flash memory. The image file may include a testing software component or a debugging software component, and the processor 120 may attempt to drive these software components to test the formal product.

It should be understood that in the foregoing embodiments, the system of the disclosure has a plurality of functional blocks or modules. Those skilled in the art should comprehend that in some embodiments, the functional blocks or modules may preferably be implemented by a specific circuit (including a dedicated circuit or a general-purpose circuit operating under one or more processors and coded instructions). In general, the specific circuit may include a transistor or other circuit components, configured in the method of the foregoing embodiments, so that the specific circuit can run according to the functions and operations described in the disclosure. Furthermore, a collaborative program between the functional blocks or modules of the specific circuit may be implemented by a specific compiler, for example, a register transfer language (RTL) compiler. However, the disclosure is not limited thereto.

Although the disclosure has been disclosed with the foregoing exemplary embodiments, it is not intended to limit the disclosure. Any person skilled in the art can make various changes and modifications within the spirit and scope of the disclosure. Accordingly, the scope of the disclosure is defined by the claims appended hereto and their equivalents.

What is claimed is:

1. A device for writing image files into memories, coupled to a hardware database, a production file database, and a software database, the device for writing image files into memories comprising:
   a memory configured to store at least one instruction; and
   a processor coupled to the memory, the hardware database and the software database, wherein the processor is configured to access and execute the at least one instruction from the memory to:
   access the production file database, wherein the production file database stores a plurality of product codes, a plurality of product types, and a plurality of component material numbers; and
   read a production code of a product from a product flash memory;

query the production file database using the production code to obtain a selected product code, a selected product type and a selected component material number of the product, wherein the selected product code, the selected product type, and the selected component material number specify a hardware component characteristic and a software component characteristic of the product;

generate an image file by comparing the hardware component characteristic with a plurality of hardware characteristic data in the hardware database and comparing the software component characteristic with a plurality of software characteristic data in the software database; and write the image file into the product flash memory, wherein the step of comparing the hardware component characteristic with the plurality of hardware characteristic data in the hardware database comprises:

search for a most similar product file in the hardware database according to the hardware component characteristic; and obtain a byte swap formula of a product processor and an address transformation formula of the product flash memory according to one of the most similar product file and a historical experience in the hardware database.

2. The device for writing image files into memories according to claim 1, wherein when comparing the hardware component characteristic with the plurality of hardware characteristic data in the hardware database, the processor is further configured to:

check whether the product processor and the product flash memory of the product are the same as a processor and a flash memory of the most similar product file; and if the same, obtain the byte swap formula of the product processor and the address transformation formula of the product flash memory according to the one of the most similar product file in the hardware database; and if one of the product processor and the product flash memory is not the same as the processor and the flash memory of the most similar product file, obtain the byte swap formula of the product processor and the address transformation formula of the product flash memory according to the historical experience in the hardware database.

3. The device for writing image files into memories according to claim 2, wherein when comparing the software component characteristic with the plurality of software characteristic data in the software database, the processor is further configured to:

check whether a software component configuration table of the product is the same as a sample software component configuration table of a sample; and if the same, apply the sample software component configuration table to the product; and if not the same, learn the product software configuration table according to system information, an instruction set, and a plurality of execution methods of the instruction set of the sample.

4. The device for writing image files into memories according to claim 3, wherein when generating the image file by comparing the hardware component characteristic with the plurality of hardware characteristic data in the hardware database and comparing the software component characteristic with the plurality of software characteristic data in the software database, the processor is further configured to:

generate the image file according to the byte swap formula of the product processor, the address transformation formula of the product flash memory, and the software component configuration table of the product.

5. A method for writing image files into memories, comprising:

accessing a production file database, wherein the production file database stores a plurality of product codes, a plurality of product types, and a plurality of component material numbers; and reading a production code of a product from a product flash memory;

querying the production file database using the production code to obtain a selected product code, a selected product type and a selected component material number of the product, wherein the selected product code, the selected product type, and the selected component material number specify a hardware component characteristic and a software component characteristic of the product;

accessing a hardware database and a software database;

generating an image file by comparing the hardware component characteristic with a plurality of hardware characteristic data in the hardware database and comparing the software component characteristic with a plurality of software characteristic data in the software database; and writing the image file into a product flash memory, wherein the step of comparing the hardware component characteristic with the plurality of hardware characteristic data in the hardware database comprises:

searching for a most similar product file in the hardware database according to the production condition; and obtaining a byte swap formula of a product processor and an address transformation formula of the product flash memory according to one of the most similar product file and a historical experience in the hardware database.

6. The method for writing image files into memories according to claim 5, wherein comparing the hardware component characteristic with the plurality of hardware characteristic data in the hardware database comprises:

checking whether the product processor and the product flash memory of the product are the same as a processor and a flash memory of the most similar product file; and if the same, obtaining the byte swap formula of the product processor and the address transformation formula of the product flash memory according to the hardware database; and if one of the product processor and the product flash memory is not the same as the processor and the flash memory of the most similar product file, obtaining the byte swap formula of the product processor and the address transformation formula of the product flash memory according to the historical experience in the hardware database.

7. The method for writing image files into memories according to claim 6, wherein comparing the software component characteristic with the plurality of software characteristic data in the software database comprises:

checking whether a software component configuration table of the product is the same as a sample software component configuration table of a sample; and if the same, applying the sample software component configuration table to the product; and if not the same, learning the software configuration table according to system information, an instruction set, and a plurality of execution methods of the instruction set of the sample.

8. The method for writing image files into memories according to claim 7, wherein generating the image file by comparing the hardware component characteristic with the plurality of hardware characteristic data in the hardware database and comparing the software component characteristic with the plurality of software characteristic data in the software database comprises:

generating the image file according to the byte swap formula of the product processor, the address transformation formula of the product flash memory, and the software component configuration table of the product.

9. A non-transitory computer readable medium, associated with a method for writing image files into memories, wherein the method for writing image files into memories comprises:

accessing a production file database, wherein the production file database stores a plurality of product codes, a plurality of product types, and a plurality of component material numbers; and reading a production code of a product from a product flash memory;

querying the production file database using the production code to obtain a selected product code, a selected product type and a selected component material number of the product, wherein the selected product code, the selected product type, and the selected component material number specify a hardware component characteristic and a software component characteristic of the product;

accessing a hardware database and a software database;

generating an image file by comparing the hardware component characteristic with a plurality of hardware characteristic data in the hardware database and comparing the software component characteristic with a plurality of software characteristic data in the software database; and writing the image file into a product flash memory, wherein the step of comparing the hardware component characteristic with the plurality of hardware characteristic data in the hardware database comprises:

searching for a most similar product file in the hardware database according to the production condition; and obtaining a byte swap formula of a product processor and an address transformation formula of the product flash memory according to one of the most similar product file and a historical experience in the hardware database.

* * * * *